US005628102A

United States Patent [19]

Johnson

[11] Patent Number: 5,628,102

[45] Date of Patent: May 13, 1997

[54] DEVICE FOR REMOVING RAILROAD RAIL RETAINER CLIPS

[76] Inventor: Wade T. Johnson, 1711 N. 11th St., Nebraska City, Nebr. 68410

[21] Appl. No.: 607,906

[22] Filed: Feb. 28, 1996

[51] Int. Cl.[6] .......... B23P 19/04

[52] U.S. Cl. .......... 29/225; 29/252; 29/270; 29/426.6

[58] Field of Search .......... 29/426.6, 426.5, 29/225, 229, 268, 253, 252, 243.56, 270; 254/10.5

[56] References Cited

U.S. PATENT DOCUMENTS

| | | | |
|---|---|---|---|
| 3,822,468 | 7/1974 | Mueller | 29/268 |
| 4,319,392 | 3/1982 | Cutts | 29/426.5 |
| 4,999,898 | 3/1991 | Schmeling | 29/267 |
| 5,161,292 | 11/1992 | Kurtyak et al. | 29/267 |
| 5,392,504 | 2/1995 | Calusinski | 29/426.6 |

*Primary Examiner*—David P. Bryant
*Attorney, Agent, or Firm*—Henderson & Sturm

[57] ABSTRACT

A hydraulically powered apparatus for removing railroad track retainer clips from retainer chairs. A support housing carries a pair of compression arms which, when hydraulically actuated, force a pair of retractor blocks together. The retractor blocks in turn carry clip compression flanges which compresses the clip so as to unlock it from the chair and clip engagement pins which withdraw the clip from the chair which the retractor block is pivoted rearward by a hydraulic actuator.

6 Claims, 10 Drawing Sheets

DEVICE FOR REMOVING RAILROAD RAIL RETAINER CLIPS

TECHNICAL FIELD

This invention relates to equipment used on railroad tracks, and more specifically to devices used to remove steel track retainer clips from steel and cast iron chairs imbedded in concrete ties.

BACKGROUND ART

Railroad tracks have typically utilized a track bed with a series of parallel, spaced apart wooden ties laid thereon. The rails are then laid on top of the ties and perpendicular thereto, and are then secured in place with metal spikes. Recent developments in the railroad industry have led to the introduction of concrete ties, primarily because of their increased durability. These concrete ties have a steel "chair" secured to the tie and resting upon its upper surface which is designed to receive a steel rail retainer clip. When the rail retainer clip is forced into the chair, often by means of a blow from a sledge hammer, the clip engages the lower flange of the railroad rail, thereby holding it securely in place. For the rail to be removed, the clip must be removed from the chair by compressing it and then sliding it rearwardly from the shoe. The prior art device for removing manually these clips is a device which somewhat resembles a very large pair of pliers. This jaws of the device are forced together to compress the clip and are then rotated rearward to withdraw the clip from the chair. This method is extremely laborious and slow, and often results in injuries to the workers.

DISCLOSURE OF THE INVENTION

The present invention discloses a hydraulically powered apparatus for removing railroad track retainer clips from retainer chairs. A base housing carries a pair of compression arms which, when hydraulically actuated, force a pair of pivot blocks together. The pivot blocks in turn carry clip compression plates which compresses the clip so as to unlock it from the chair and clip retraction pins which withdraw the clip from the chair when the pivot block is pivoted rearward by means of a hydraulic actuator.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
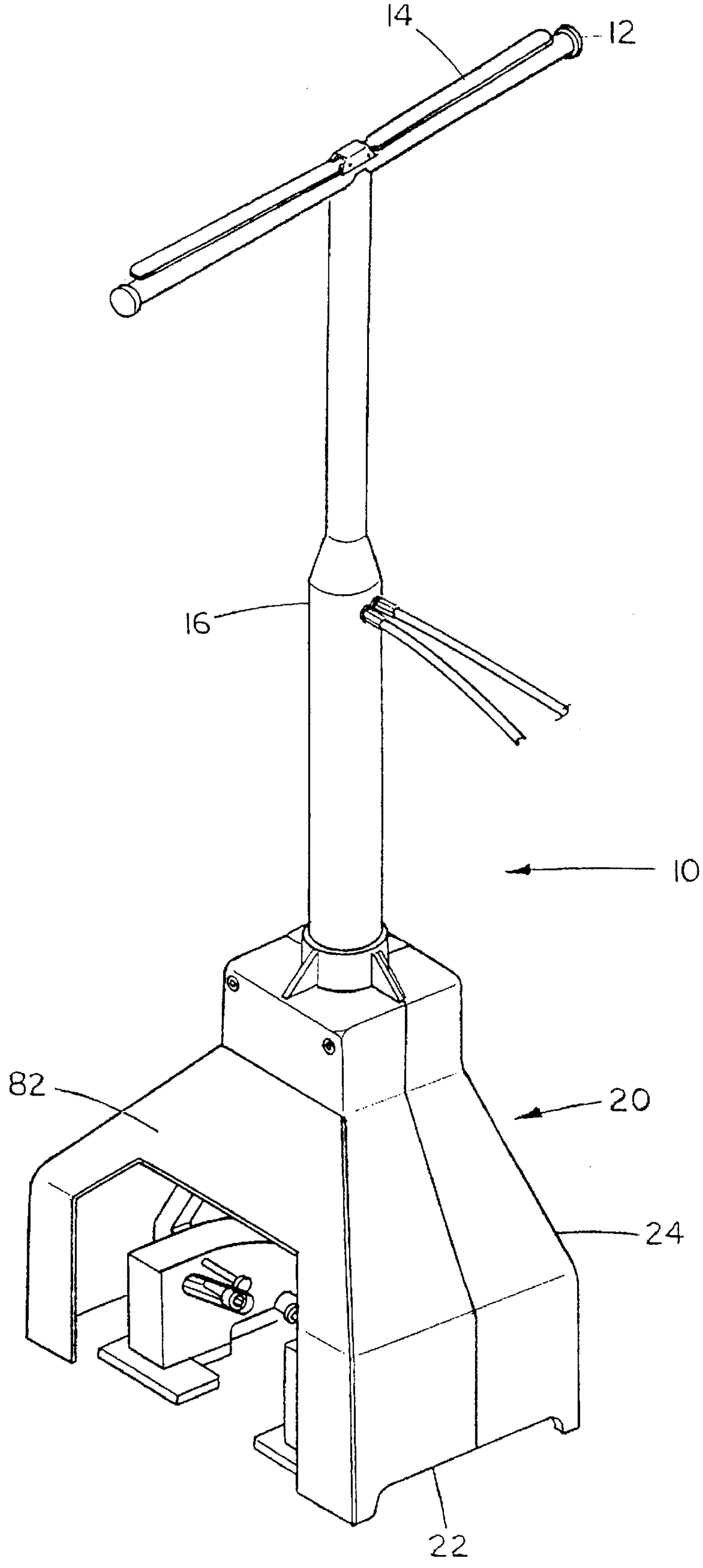
FIG. 1 is a perspective view of the invention.

Referring now to the drawings wherein like reference numerals designate identical or corresponding parts throughout the several views, the invention, fabricated primarily from steel, is depicted generally at 10 in FIG. 1 and is seen to comprise a handle 12 upon which is pivotally mounted a pair of hydraulic actuation levers 14. A tubular housing 16 is threaded into the upper end of a base housing 20. As clearly seen in FIG. 2B, the base housing 20 is comprised of a front section 22 and a rear section 24 which are secured together by means of six bolts 26 which extend through the front section 22 and are threaded into threaded sockets in the rear section.

Figure 2A:
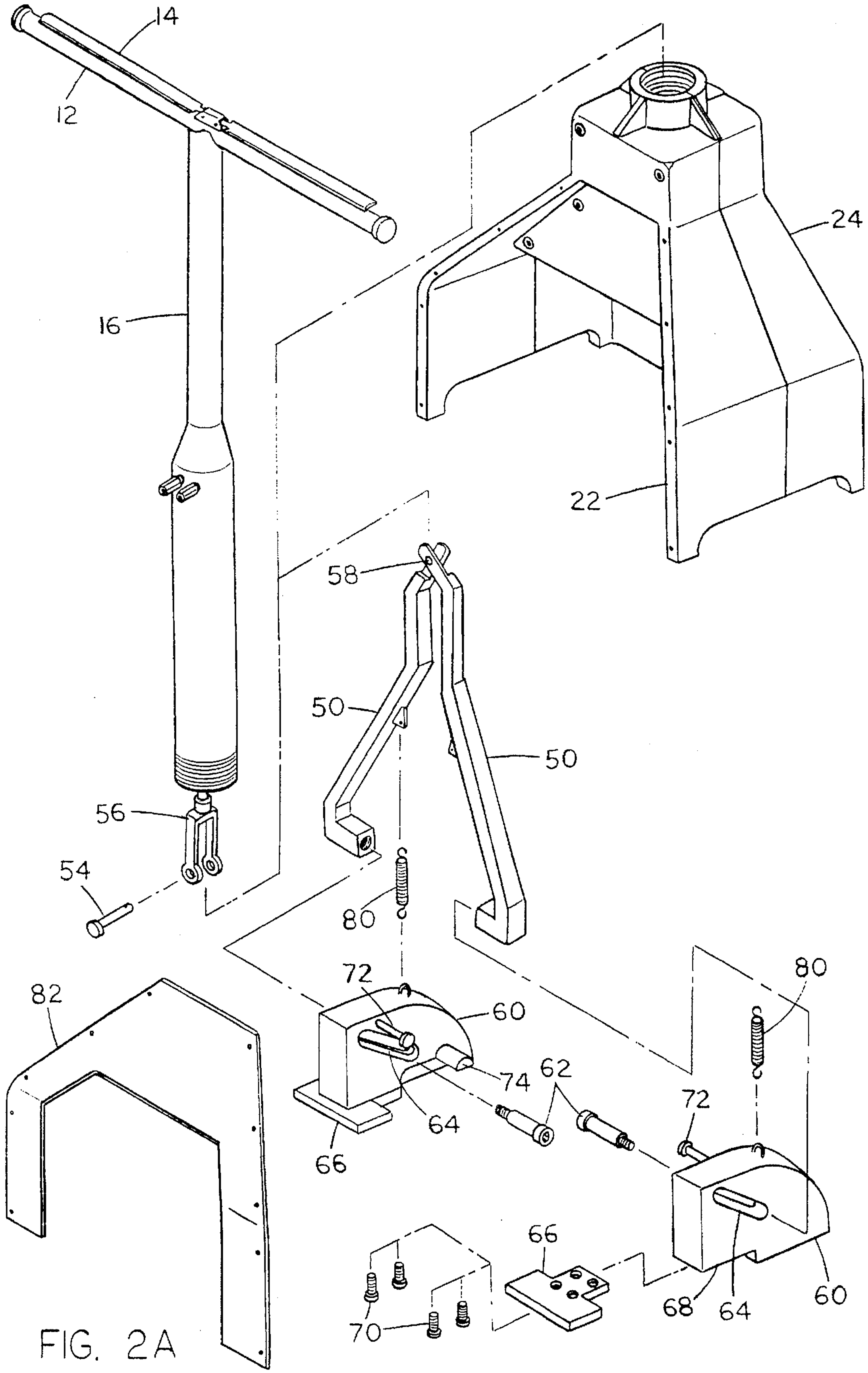
FIG. 2A is a partially exploded view of the invention.
Figure 2B:
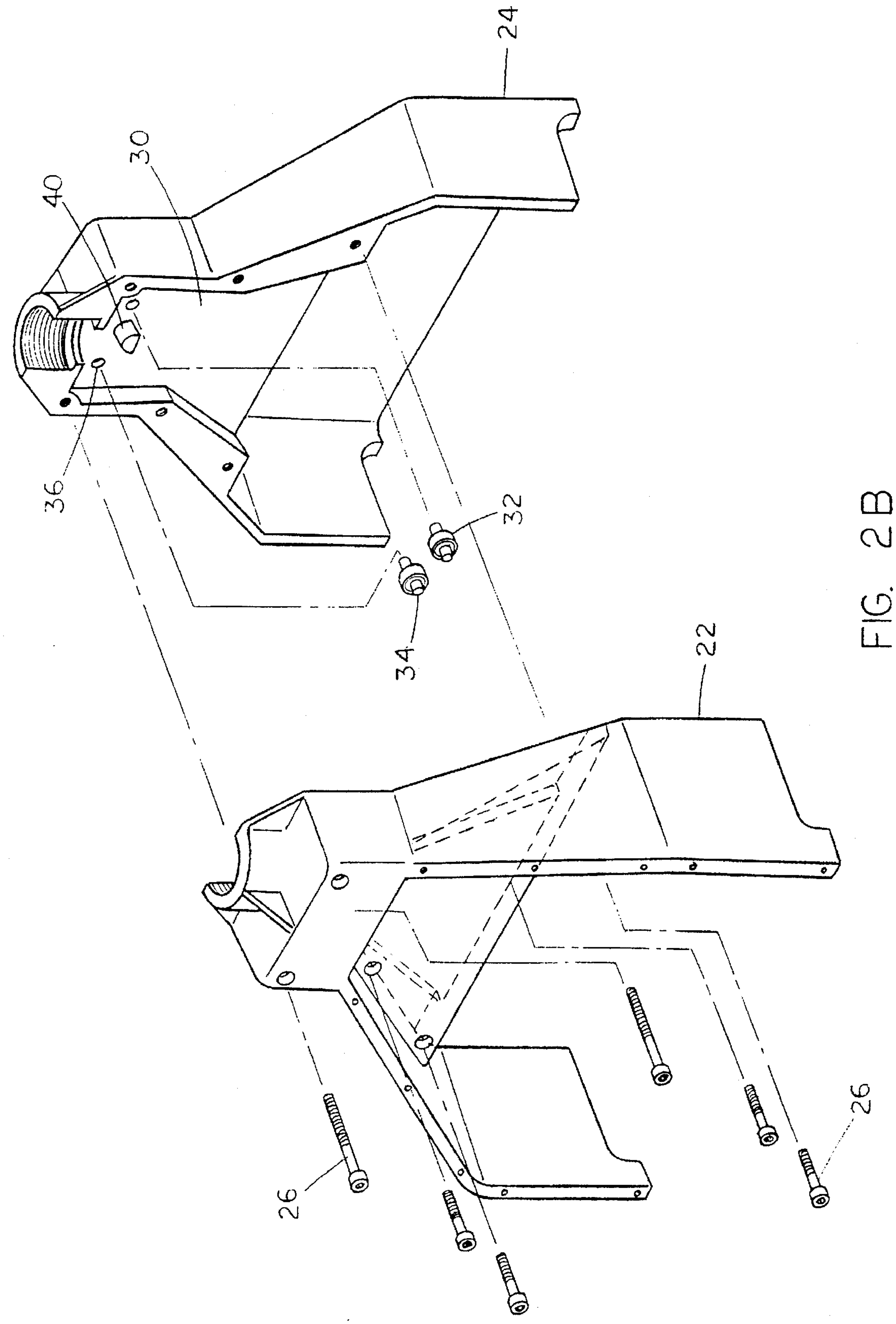
FIG. 2B is an exploded view of the base of the invention.

Referring primarily to FIG. 2B, but also to FIGS. 5–10, the mating of the two base housing sections 22, 24 is seen to form an interior passageway 30. Extending across the upper portion of the passageway 30 are a pair of compression arm rollers 32 with studs 34 which extend into apertures 36. A compression arm guide 40 also extends across the upper portion of the passageway 30 between the rollers 32.

Referring now to FIG. 2A, a pair of steel compression arms 50 are movably secured to the piston of a dual acting hydraulic cylinder 52 (FIG. 5) by means of a pivot pin 54 extending through a piston yoke 56 and holes 58 in the upper ends of the compression arms 50. The dual acting hydraulic cylinder is normally biased to the extended position and will retract upon actuation of lever 14. Further description of the operation of the hydraulic actuator should not be required for those skilled in the art.

Figure 12:
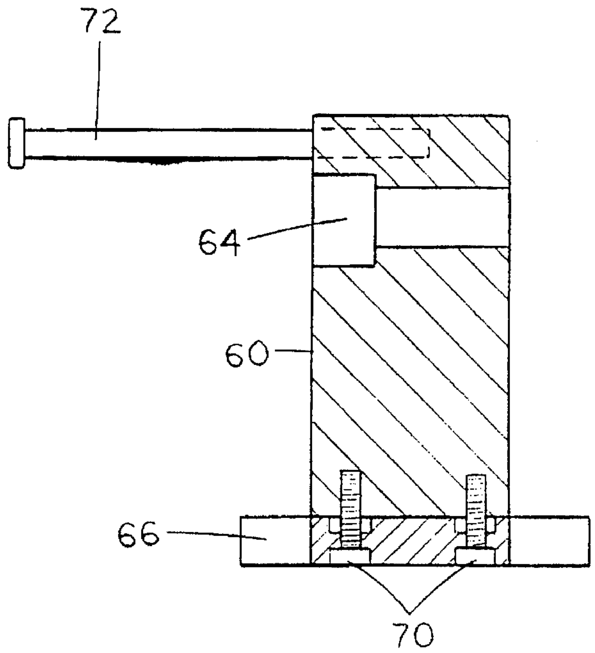
FIG. 12 is a sectional view taken along line 12—12 of FIG. 11.
Figure 13:
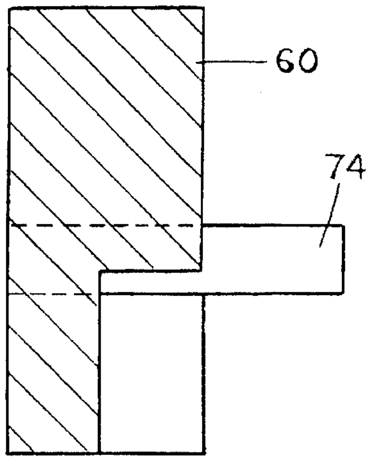
FIG. 13 is a sectional view taken along line 13—13 of FIG. 11.

A pivot block 60 is pivotally and slidably affixed to the lower end of each compression arm 50 by means of a roller pin 62 which extends through an angled slot 64 formed through each pivot block 60. The roller pins 62 are threaded into threaded sockets formed in the lower, inwardly turned ends of each of the compression arms 50. As seen in FIG. 12, the inner edge of the angled slot 64 is somewhat wider to provide space for the head of each roller pin 62. The forward end of each pivot block 60 is provided with a compression plate 66 which is secured to within a corresponding cutout 68 in the lower surface of the pivot block 60 by means for four hex head bolts 70 countersunk into the lower surface of the plate 66. Extending inwardly from each of the pivot blocks 60 is a spacer pin 72 press fit into holes in the inner surface of the pivot block 60 as seen in FIG. 12. The spacer pins 72 contact each other when the pivot blocks 60 are forced together and serve to limit any twisting of the pivot blocks 60. Each pivot block 60 is further provided with a clip retraction pin 74 press fit into its respective aperture in each pivot block 60 as seen in FIG. 13. Finally, each pivot block 60 is provided with a spring 80 extending from its upper surface to the inner edge of its respective compression arm 50 as seen in FIG. 2A. These springs 80 serve to hold the pivot blocks 60 horizontal and with the roller pins 62 in the lower, rear end of each angled slot 64 when the device is not in operation. Finally, a cover plate 82 is screwed to the forward edges of front section 22.

Figure 3:
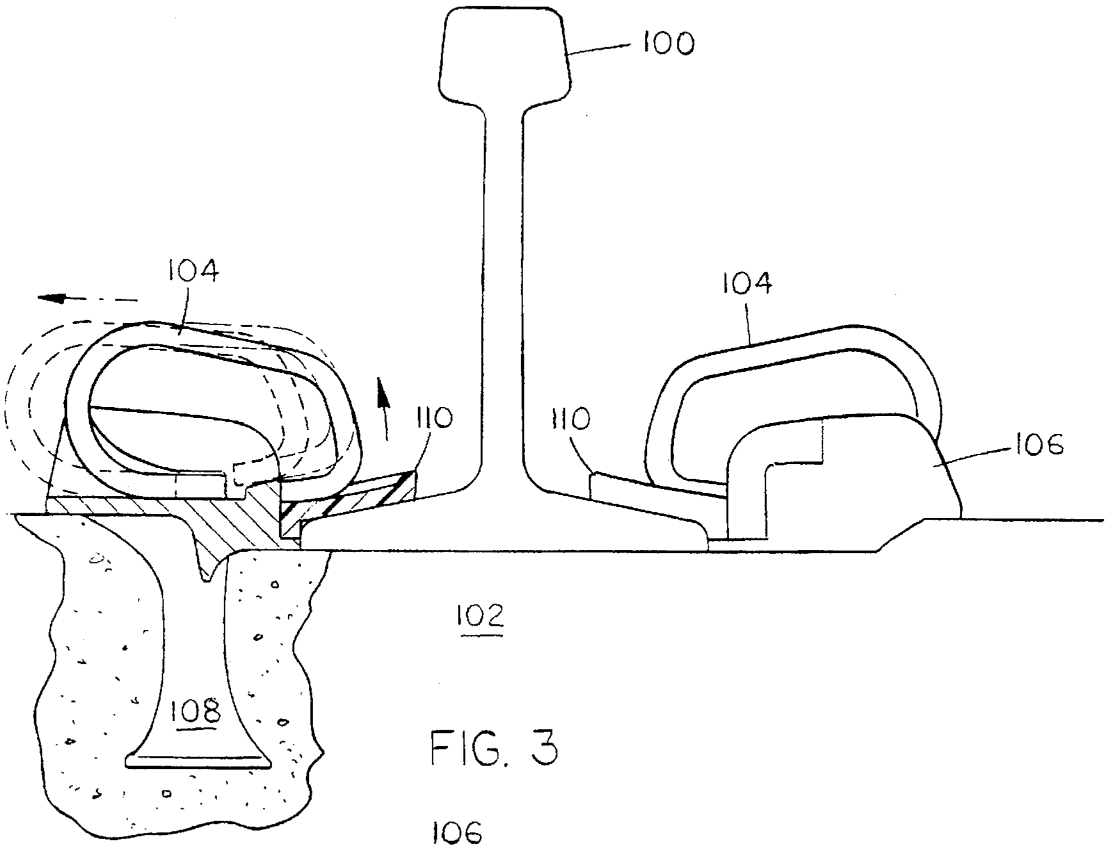
FIG. 3 is side elevational view, in partial section, of a railroad rail held in place on a concrete tie by means of two steel chairs imbedded in the concrete and a steel rail retainer clip engaged in each chair, and depicts the removal of the left clip from the left chair in phantom lines.
Figure 4:
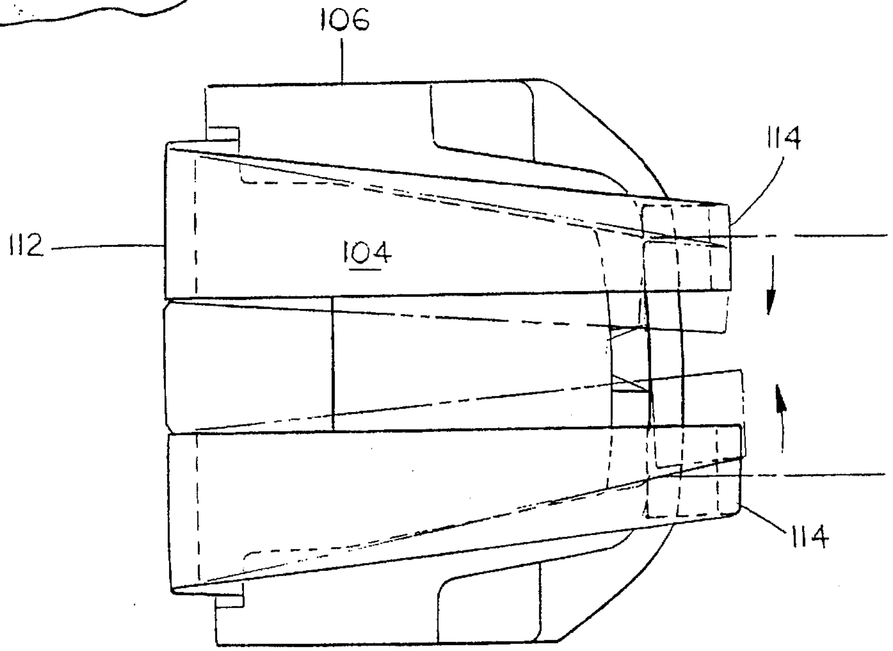
FIG. 4 is a top plan view of a rail retainer clip engaged in a chair and depicts the compression of the clip for removal from the chair in phantom lines.
Figure 5:
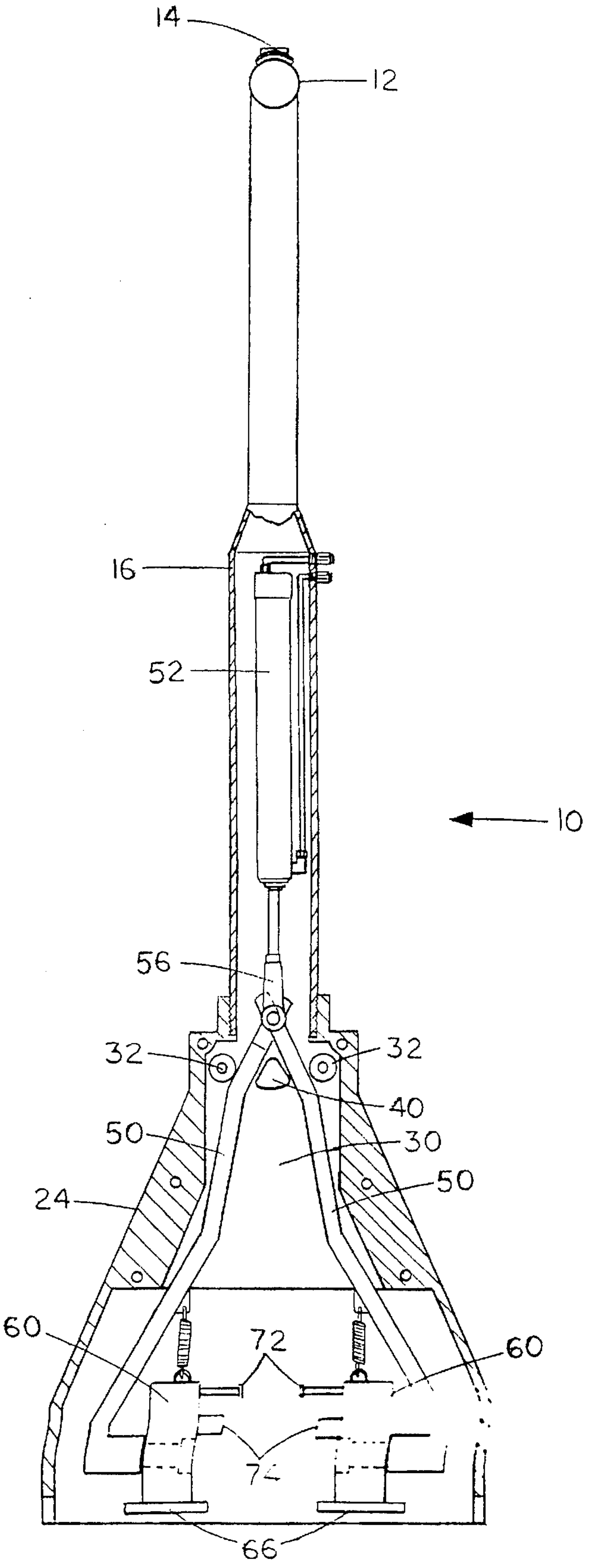
FIG. 5 is a front sectional view of the invention.

Referring now to FIG. 3, a railroad rail 100 is shown secured to a concrete tie 102 by means of a pair of rail retainer clips 104 which are engaged within their respective chairs 106. The chairs 106 have lugs 108 which are imbedded within the concrete of the tie 102. Electrically isolating the retainer clip 104 from the steel rail 100 is a plastic insulator 110. Referring to FIG. 4, the retainer clip 104 may be driven into engagement with the chair 106 by striking its rear side 112 with a sledge hammer. As the clip 104 is driven into the chair 106, its two front spaced-apart flanges 114 are first compressed together and then release outward to engage the front of the chair 106. To disengage the clip 104 from the chair 106, the two front spaced-apart flanges 114 must again be compressed together while the clip 104 is pulled rearwardly out of the chair 106.

FIGS. 6 through 10 depict the operation of the present invention as will now be thoroughly described. In the cross-sectional view of FIG. 6, the hydraulic cylinder 52 is in its biased, extended position, which action drives the compression arms 50 downward over the compression arm guide 40, forcing the compression arms 50 to their separated position. In this configuration, the invention is placed down over a rail retainer clip 104 which is to be removed from its respective chair 106.

Figure 7:
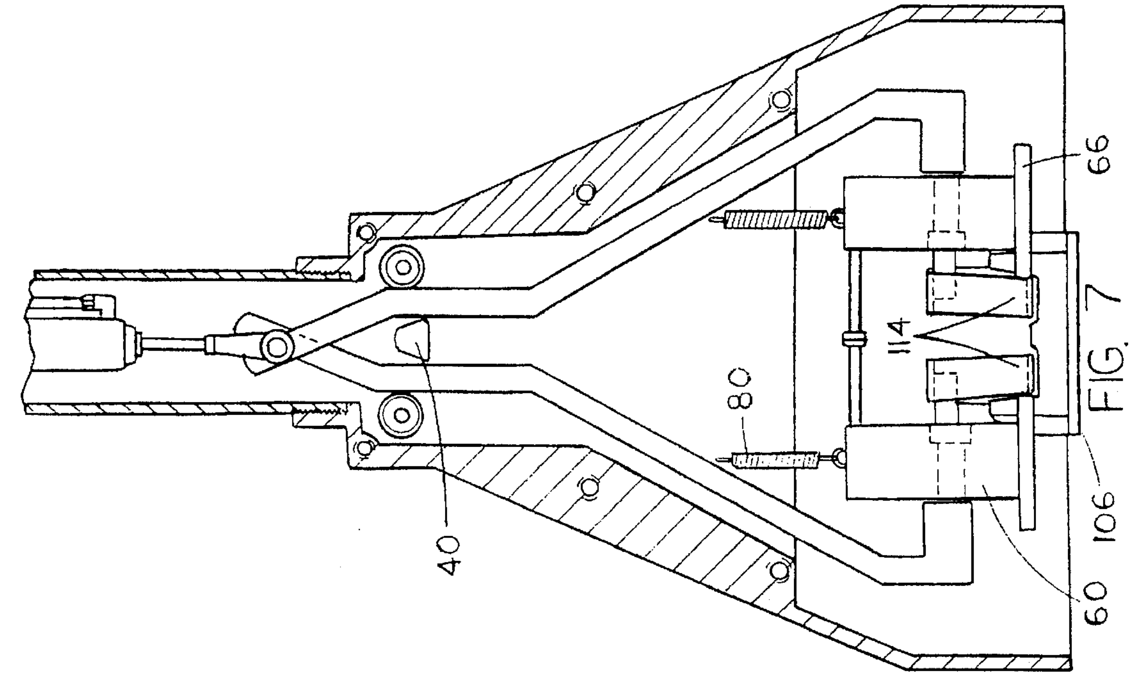
FIG. 7 is a partial front sectional view of the invention compressing the retainer clip but before retraction has begun.
Figure 6:
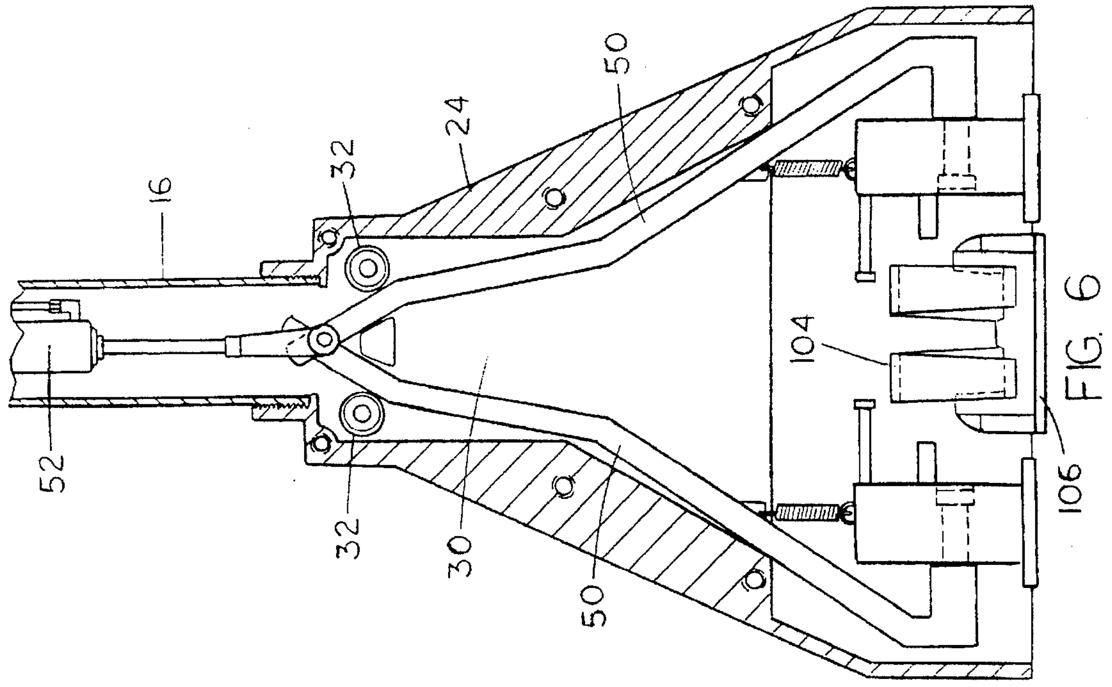
FIG. 6 is a partial front sectional view of the invention placed over a rail retainer clip and chair in preparation for removing the clip from the chair.

In FIG. 7, the hydraulic piston has withdrawn approximately one inch, pulling the compression arms 50 upward. The outwardly angled compression arms 50 are then forced together into parallel alignment as they are drawn upward between the compression rollers 32. This action drives the two pivot blocks 60 inwardly, with the compression plates 66 compressing the flanges 114 of the clip 104 inwardly and with the clip retraction pins 74 engaging the rear loop of the clip 104.

Figure 8:
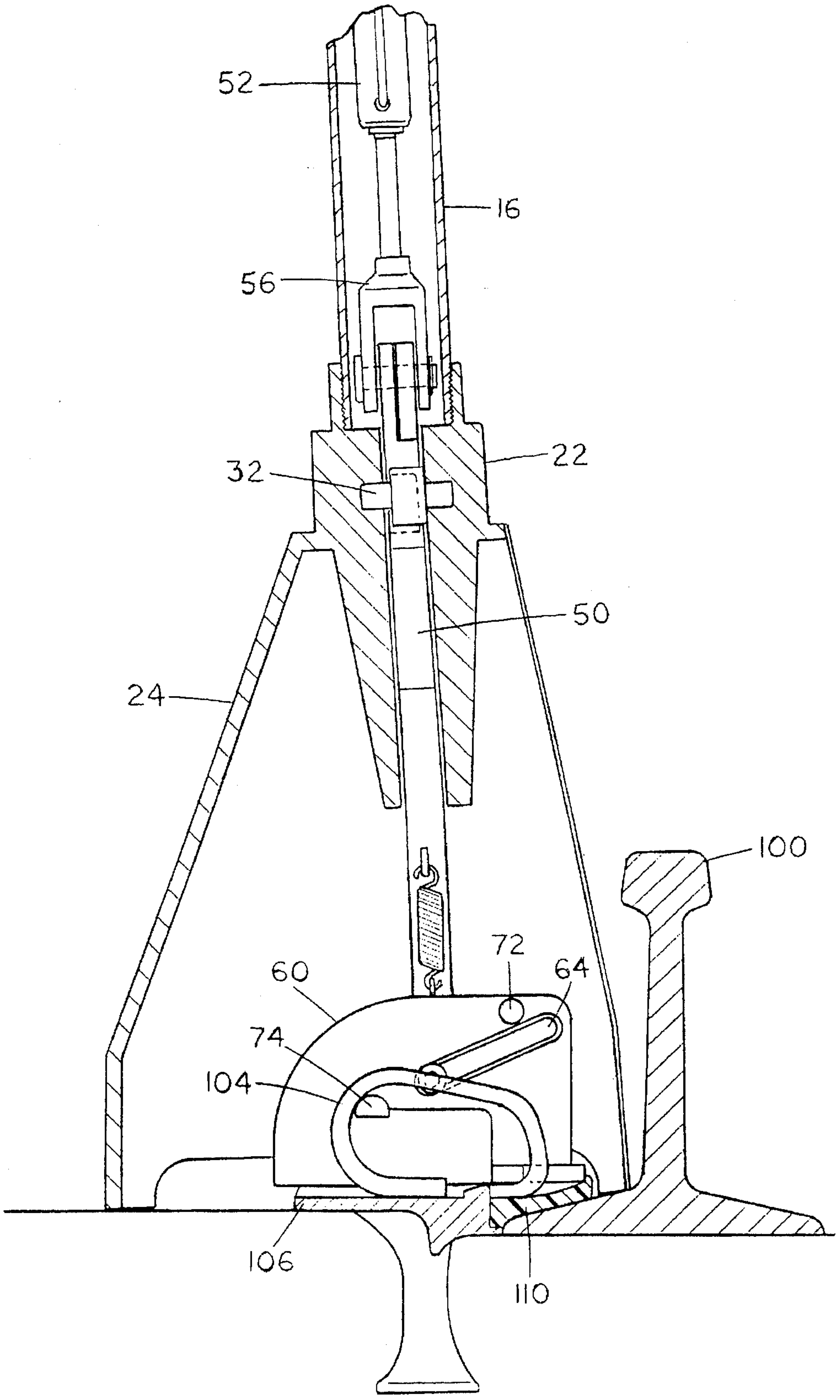
FIG. 8 is a sectional side view of the invention compressing the retainer clip but before retraction has begun.

FIG. 8 is a sectional side view of the invention as shown in FIG. 7, and shows the left clip retraction pin inserted within the rear loop of the clip 104 as well as the left compression plate 66 in contact with the left flange 114 of the clip 104.

Figure 9:
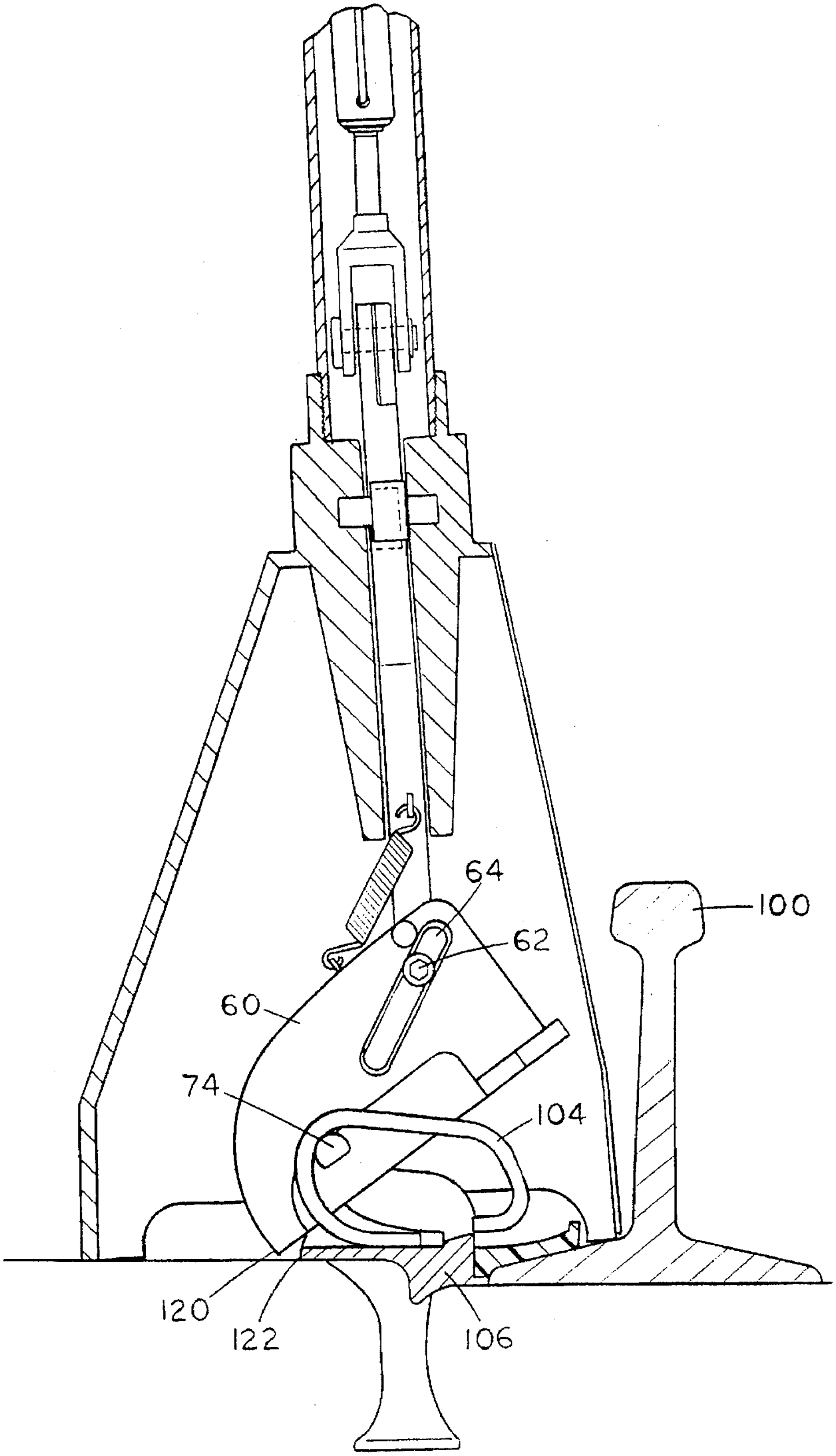
FIG. 9 is a sectional side view of the invention approximately one half way through retraction of the retainer clip from the chair.
Figure 10:
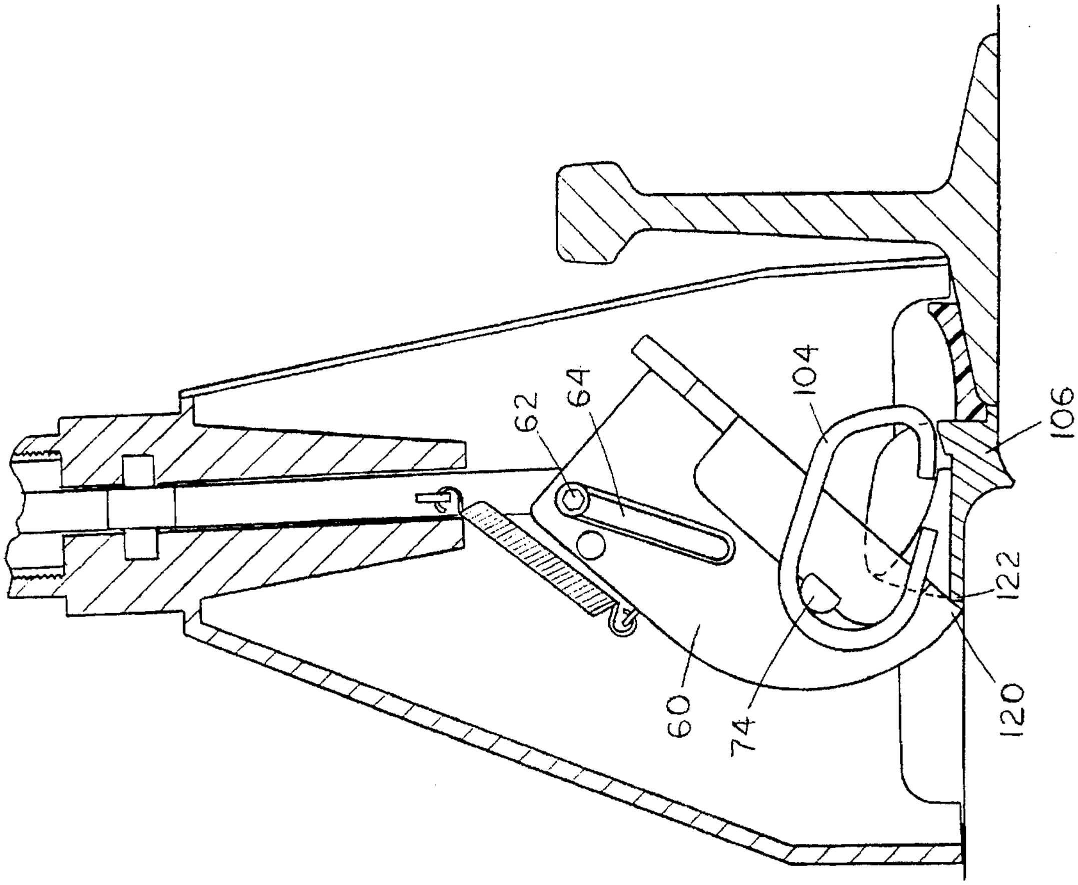
FIG. 10 is a sectional side view of the invention with the retainer clip withdrawn from the chair.
Figure 11:
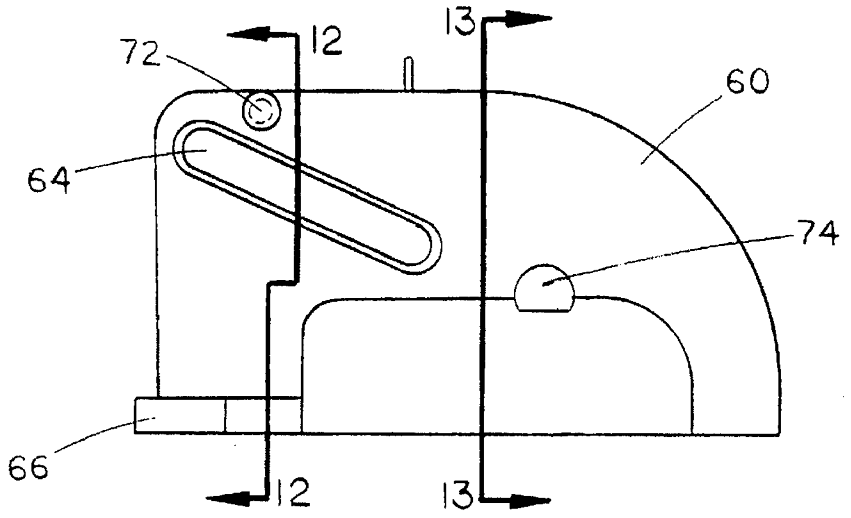
FIG. 11 is a side view of a pivot block.

In FIG. 9, the hydraulic piston has been withdrawn approximately one inch more. As this occurs, the roller pins 62 are drawn upward in angled slots 64 causing the pivot block to rotate rearward around clip retraction pins 74 which are prevented from moving upward by the clip 104. This rotation causes the lower rear edge 120 of the pivot blocks 60 to engage the rear 122 of the chair 106. In FIG. 10, the hydraulic piston has been fully retracted, drawing roller pins 62 fully upward in angled slots 64 and fully pivoting the pivot blocks 60. With the lower rear edge 120 of the pivot blocks 60 engaged with the rear 122 of the chair 106, this pivoting action causes the clip retraction pins 74 to be pulled rearward, withdrawing the clip 104 from the chair 106.

When the hydraulic actuator levers 14 are released, the hydraulic cylinder 52 returns to the extended position and compression arms 50 are again forced into their spread position by the compression arm guide 40. This action also spreads the pivot blocks 60 and allows the removed clip to fall free.

Obviously, many modifications and variations of the present invention are possible in light of the above teachings. It is therefore to be understood that, within the scope of the appended claims, the invention may be practiced otherwise than as specifically described.

What is claimed is:

1. A device for removing a railroad rail retainer clip from a rail retainer chair, comprising:

a base housing enclosing a compression arm passageway having first and second compression rollers and a compression arm guide extending therethrough;

first and second compression arms, each having an upper end and a lower end, said compression arms pivotally secured together at their upper ends, said first compression arm extending downwardly through said compression arm passageway between said first compression roller and said compression arm guide, and said second compression arm extending downwardly through said compression arm passageway between said second compression roller and said compression arm guide;

first and second pivot blocks pivotally and slidably affixed to said lower end of said first and second compression arms, each of said pivot blocks including a clip retraction pin extending therefrom for engagement with the rail retainer clip, and further including a compression plate for compression of the rail retainer clip; and hydraulic actuation means secured to said upper ends of said compression arms.

2. The device as recited in claim 1 wherein said base housing comprises a first section secured to a second section.

3. The device as recited in claim 1 wherein said pivot blocks include an angled slot extending therethrough for receipt of a roller pin carried on said lower end of said compression arms.

4. The device as recited in claim 1 wherein said pivot blocks further comprise a spacer pin.

5. The device as recited in claim 1 and further comprising a spring extending between said pivot blocks and said compression arms.

6. The device as recited in claim 1 wherein said hydraulic actuation means is biased in an extended position.

* * * * *